Patented June 26, 1951

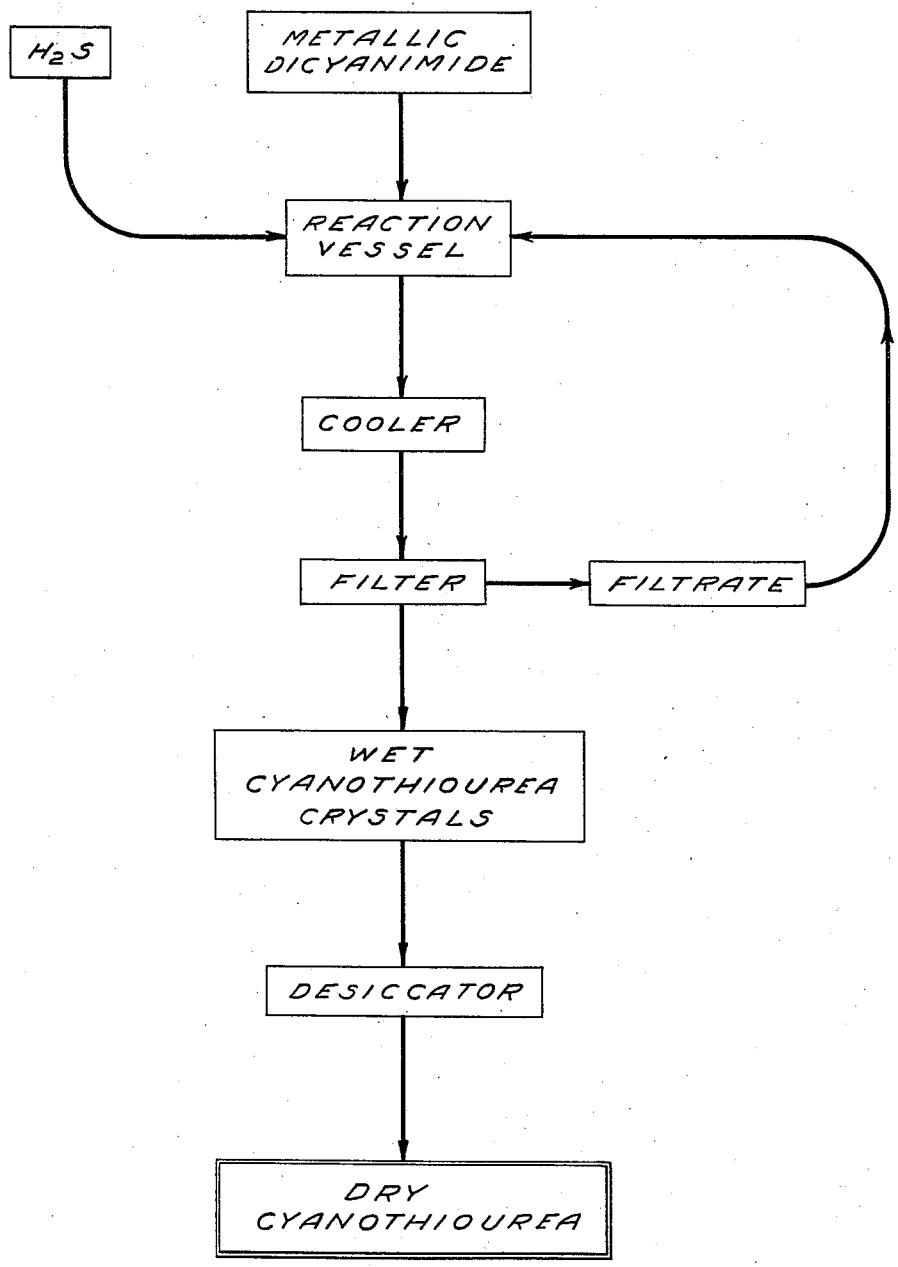

2,557,984

UNITED STATES PATENT OFFICE 2,557,984

PREPARATION OF CYANOTHIOUREA

Nat H. Marsh, Noroton Heights, and Richard W. Hamilton, Norwalk, Conn., assignors to American Cyanamid Company, New York, N. Y., a corporation of Maine Application March 15, 1949, Serial No. 81,464

5 Claims. (Cl. 260—551)

This invention relates to a new compound, cyanothiourea, and a method of preparing it.

Cyanothiourea is a white crystalline powder when crystallized from water, and has a melting point of ca. 135° C. At low temperatures, i. e., 0°–5° C., it is nearly insoluble in water. At 25° C. 10 g. dissolves in 100 g. of water, and at 50° C., 40 g. At higher temperatures in either neutral or acid solution it is decomposed; however, it is stable in either cool or hot alkaline solutions, and is extremely soluble in alkaline solution, even at room temperature. It is a valuable intermediate in the preparation of dithiobiuret.

It is an object of this invention to prepare cyanothiourea by reacting a metallic dicyanimide with hydrogen sulfide, and it is a more particular object to prepare cyanothiourea by the reaction of calcium dicyanimide with hydrogen sulfide under controlled conditions.

The invention also contemplates the production of cyanothiourea from a solution of calcium dicyanimide that also contains calcium chloride as a by-product in the preparation of said calcium dicyanimide, and it is an object of this invention to proceed from calcium cyanamide and cyanogen chloride, with the addition of hydrogen sulfide at an intermediate stage, finally to cyanothiourea, without the necessary use of solid calcium dicyanimide at any stage of the process.

The drawing represents a flow chart of one embodiment of the process of the invention.

Using calcium dicyanimide, the following is postulated:

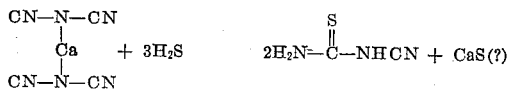

The product CaS is queried because it is ordinarily insoluble in water. In that present reaction, however, no metallic sulfide or other metallic compound precipitates, and it is assumed that if CaS is formed, it is retained in solution as an unidentified complex. In any event, the metallic part of the dicyanimide remains in solution during the subsequent working up of the reaction mass and does not interfere with the recovery of either dithiobiuret or cyanothiourea. The inventors do not wish to be bound by any supposed reaction mechanism. It suffices to say that when a metal dicyanimide is reacted with hydrogen sulfide under the conditions hereinafter described, cyanothiourea is obtained.

A stock solution of calcium dicyanimide suitable as a starting material for the addition of hydrogen sulfide in some of the examples that follow may be prepared by slurrying crude calcium cyanamide with cyanogen chloride in water, filtering, and using the thus-formed solution of calcium dicyanimide and calcium chloride as the reaction menstruum. This is probably the most economical method of conducting the process.

*Preparation of stock solution of calcium dicyanimide*

| Reactants | Molar Ratio |
|---|---|
| Cyanogen chloride | 1.0 |
| Crude calcium cyanamide (58%) | 1.0 |
| Water | 27.8 |

The cyanogen chloride is carefully added to the agitated aqueous slurry of crude calcium cyanamide at a rate of about 1 mol per 0.5 hour. The temperature range is substantially 28°–30° C. and the cyanogen chloride is absorbed readily. As soon as exothermic tendencies stop, the reaction mixture is neutralized with dilute hydrochloric acid. The insoluble impurities are removed and a clear, slightly yellow filtrate is obtained, which contains mainly calcium dicyanimide and calcium chloride. The calcium chloride does not interfere with subsequent production of cyanothiourea.

In general, it may be stated that an aqueous slurry of the metallic dicyanimide, or a solution if it is soluble, is prepared and hydrogen sulfide is passed into the warm slurry or solution until cyanothiourea is formed. The time and temperature at which the reaction is carried out are critical unless the pH of the medium is deliberately controlled, for cyanothiourea is readily converted to dithiobiuret, i. e., after cyanothiourea is formed it has a tendency to react with more hydrogen sulfide to form dithiobiuret. However, good yields of cyanothiourea with little or no contamination of dithiobiuret are obtainable if the following considerations are observed.

Virtually no cyanothiourea is formed below a temperature of about 55° C., even if the "reaction" is continued for several hours. However, at 55° C. and a reaction period of about 3 hours, a good yield of cyanothiourea, contaminated with some dithiobiuret, is obtained. Higher temperatures up to 100° C. may be used, but the time of reaction must be decreased. If the reaction is carried out at 100° C. it should be stopped after about one hour to avoid conversion of a substantial quantity of cyanothiourea into dithiobiuret.

In the procedures discussed in the preceding paragraph, it has been assumed that no deliberate attempt has been made to affect the pH of the system. However, it has been found that the best yields are obtained when the pH is maintained at about 6–7 as, for example, by the addition of the necessary amount of hydrochloric acid from time to time, and when the pH is so fixed the time of reaction may extend to 3 hours or more, even in the higher temperature ranges, for example, at 100° C.

It is preferred to discontinue heating the solution after the addition of hydrogen sulfide ceases in order to prevent excessive side reactions. As a matter of fact, it is preferred to chill the reaction mass immediately upon cessation of the reaction.

When a mixture of cyanothiourea and dithiobiuret is formed the two may be separated by virtue of the comparative insolubility of dithiobiuret in alkaline solution. For example, a solution containing both is cooled to room temperature and the pH adjusted to about 10 by addition of sodium hydroxide or the like. Dithiobiuret is precipitated, and is filtered off and recovered. The filtrate is then chilled to 5°–10° C. and acidified to a pH of 2–3 by addition of hydrochloric acid or the like to precipitate cyanothiourea, which is also filtered off and recovered.

Wet cyanothiourea may conveniently be dried in a vacuum desiccator or over a drying agent, or by any other means in which it is not heated above its decomposition point.

The following examples illustrate the invention.

*Example 1*

An aqueous solution of 10.3% calcium dicyanimide was heated for one hour at a temperature of about 96°–97° C. with constant gasification by hydrogen sulfide for this period. The solution was cooled, acidified with hydrchloric acid to a pH of about 2 or 3, and the resulting crystalline precipitate which was a mixture of cyanothiourea and dithiobiuret, was filtered off. The yield of cyanothiourea was 55%, while that of dithiobiuret was 6%. The two were separated by slurrying in cool water and proceeding as described above.

*Example 2*

If the temperature is decreased, the time of reaction may be increased. For example, the solution described in Example 1 was heated for three hours at a temperature of 65° C. with constant introduction of hydrogen sulfide gas. The yield of cyanothiourea was 48% and that of dithiobiuret 9%.

*Example 3*

If the temperature is increased for the longer reaction period, the yield is reduced. For example, the solution as described in Example 1 was heated for three hours at 80° C. The yield of cyanothiourea was 42% and that of dithiobiuret 16%.

*Example 4*

However, higher temperatures may be used with the longer reaction periods for increased yields if the pH is controlled. For example, the reaction described in Example 1 was carried out for three hours at 95° C., with addition of hydrochloric acid to maintain the pH within the range 6–7. The yield of cyanothiourea was 71% and it was not contaminated with dithiobiuret.

In general, in the absence of pH control, the temperature necessary is qualitatively inversely proportional to the time of reaction. The times and temperatures given in the above examples are believed to be the most practicable ones. If the temperature is decreased to low values such as those in the neighborhood of room temperature, the reaction would take so long as to be of little or no value. Conversely, if the temperature is increased substantially above 100° C., little or no cyanothiourea would be obtained, as it would react further with hydrogen sulfide to create impurities in the reaction mass.

In addition to calcium dicyanimide, the following dicyanimides have been found suitable for the reaction, and are typical rather than exclusive: sodium, potassium, ammonium, magnesium, and zinc. Zinc dicyanimide is initially insoluble, but dissolves as the reaction proceeds.

While the invention has been described with particular reference to specific embodiments, it is to be understood that it is not to be limited thereto but is to be construed broadly and restricted solely by the scope of the appended claims.

We claim:

1. The method comprising heating a metal dicyanimide, water, and hydrogen sulfide at atmospheric pressure at a temperature within the approximate range 55° C.–100° C., at a pH of about 6 to 7 cooling the solution to about room temperature, adjusting the pH to about 10, filtering, adjusting the pH of the filtrate to about 2–3 and chilling same to precipitate cyanothiourea, and recovering the thus-formed cyanothiourea.

2. The method comprising subjecting a metal dicyanimide in water to the action of hydrogen sulfide at substantially atmospheric pressure for about 3 hours at 95° C. while maintaining a pH of about 6–7, whereby cyanothiourea is formed, and recovering the thus-formed cyanothiourea.

3. The method according to claim 2 in which hydrogen sulfide is passed through an aqueous solution of calcium dicyanimide.

4. The method of separating dithiobiuret from cyanothiourea from a mixture comprising the two, said method comprising slurrying the mixture in water at a temperature less than 55° C. having a pH of about 10, whereby dithiobiuret remains substantially undissolved and cyanothiourea dissolves, separating dithiobiuret from the solution, chilling and acidifying the solution to a pH of about 2–3, whereby cyanothiourea is precipitated, and separating same from solution.

5. A method comprising heating a metal dicyanimide, water, and hydrogen sulfide at atmospheric pressure within the temperature range 55°–100° C., at a pH of about 6 to 7, whereby cyanothiourea is formed and recovering said cyanothiourea.

NAT H. MARSH.
RICHARD W. HAMILTON.

REFERENCES CITED

The following references are of record in the file of this patent:

FOREIGN PATENTS

| Number | Country | Date |
|---|---|---|
| 14,881 of 1892 | Great Britain | July 22, 1893 |
| 63,501 | Denmark | May 22, 1945 |

OTHER REFERENCES

Wunderlich, Ber. deut. chem., vol. 19 (1886), p. 450.
Hecht, Ber. deut. chem., vol. 23 (1890), p. 1658.
Fromm, Ber. deut. chem., vol. 55 (1922), p. 804.
Short, Chem. News, vol. 126 (1923), pp. 100–101.
Franklin, Nitrogen System of Compounds (1935), pp. 122 and 123.